United States Patent Office 3,413,886
Patented Dec. 3, 1968

3,413,886
BLIND NUTS WITH RESILIENT SPLIT
TAPERED CAGE
Ronald Proctor, 2 Robins Court, Upton Pyne,
Exeter, Devon, England
Filed Jan 3, 1967, Ser. No. 606,946
1 Claim. (Cl. 85—73)

ABSTRACT OF THE DISCLOSURE

A blind nut having a resilient cage in which is positioned a screw threaded nut, the bore of the cage within, which the nut is held by friction has parallel sides and has a plurality of slots in the wall thereof. The outer periphery of the cage wall is tapered, whereby on the cage being inserted into a hole in a parent member, the slots are closed and the upper part of the cage bore takes, a tapered formation. On axially moving the nut along the cage, the cage is distorted to secure it in the parent member.

---

This invention relates to blind nuts of the kind wherein a cage member has located therein a nut member which is adapted to be axially moved along a screw threaded member to distort the cage member to secure it in a parent member.

A blind nut having a resiliently tapered cage, in the bore of which is frictionally held a screw threaded nut. The periphery of the cage has provided therein a plurality of slots which permits of the cage closing inwardly when inserted into a hole in the parent member to frictionally hold the cage in position in the parent member, whilst when a screw threaded member is axially moved along the nut, the cage is distorted to lock the cage and screw threaded nut in the parent member by the formation of a ridge around the underside of the hole in the parent member.

The object of the present invention is to provide a more simplified and efficient form of blind nut of the kind referred to.

Figure 1:
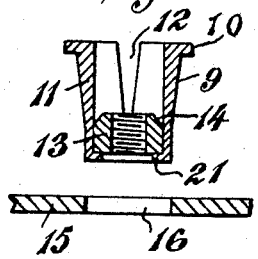
FIGURE 1 is a vertical section of a blind nut according to this invention.
Figure 2:
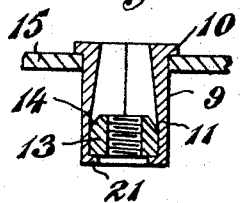
FIGURE 2 is a similar section to that shown in FIGURE 1, with the blind nut in a parent member in which it is to be located.
Figure 3:
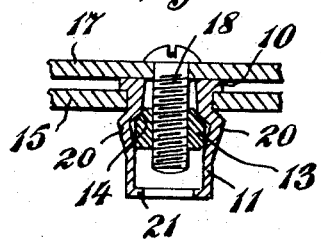
FIGURE 3 is a similar view to those already shown with a second parent member in position and the blind nut secured to the two parent members.

In the embodiment of the blind nut shown in the accompanying drawing, a cage 9, one end of which is provided with a flange 10 and a parallel bore 11.

The wall of the cage member 9 is provided with a plurality of V-shaped slots 12.

Mounted in the bore of the cage 9 is a circular nut 13, the periphery of which may be knurled or the like to increase the friction between the bore 11 of the cage 9 and said nut, which is held by friction in the bore 11.

The upper edge of the nut 13 may be provided with a chamfer 14, to facilitate its movement along the bore 11, as hereinafter explained.

The wall of the cage member 9 is formed with a taper extending from under the flange 10 to approximately the height of the circular nut 13 when the latter is located in the lower end of the bore 11 of the cage member 9, whilst a shoulder 21 formed at the lower end of the bore 11, prevents the nut 13 passing inadvertantly out of the cage 9.

In use one parent member 15 has formed therein a hole 16 which is of a size to take the lower parallel walled end of the cage member 9 in which the circular nut 13 is secured by friction. The cage member 9 is then pressed home into the hole 16 which causes the taper thereof to close in and reduce the bore thereof, which is possible owing to the V-shaped slots 12 formed therein, and securely hold the cage member 9 and nut 13 in position, ready for assembly.

The second parent member 17 is then placed in position and a fastening screw 18, screwed into the nut 13. The head of the fastening screw 18 abutting the parent member 17 causes the nut 13 to travel along the screw 18 and causes the nut 13 to distort the cage 9 and form a ridge 20 around the underside of the hole 16 in the first parent portion 15, preventing the withdrawal of the cage 9, and at the same time securing the second parent part 17 in position.

The blind nut according to this invention is particularly adapted for use with a cage made from a plastics which offers many advantages, particularly to the electrical trades.

What I claim is:

1. A blind nut, embodying a circular resilient cage member having an outwardly extending flange at the upper end thereof for preventing the passage of the cage member through a circular hole in a parent member in which it is adapted to be inserted, a plurality of slots formed in the periphery of the cage member extending partly to the lower end thereof, a tapered portion formed on the periphery of the cage member under the outwardly extending flange to frictionally hold the cage member in position in the hole in the parent member when the taper thereon is closed to reduce the bore of the cage member when placed in position in the parent member, a screw threaded nut frictionally held in position in the bore of the cage member and a flange extending into the bore of the cage member at its lower end to prevent the screw threaded nut passing out of the bore, the nut being advanced along a fastening screw when threaded through the nut, causing the cage member to be distorted and form a ridge around the underside of the hole in the parent member in which it is positioned and prevent its withdrawal therefrom.

References Cited

UNITED STATES PATENTS

| 2,319,376 | 5/1943 | Wallace | 85—75 |
|---|---|---|---|
| 2,665,597 | 1/1954 | Hill | 85—73 |
| 2,836,214 | 5/1958 | Rapata | 85—80 |
| 3,196,733 | 7/1965 | Cohen et al. | 85—75 |
| 3,313,200 | 4/1967 | Fischer | 85—75 |

FOREIGN PATENTS

| 245,773 | 3/1966 | Austria. |
|---|---|---|
| 1,018,678 | 10/1952 | France. |
| 1,339,663 | 9/1963 | France. |
| 536,476 | 5/1941 | Great Britain. |
| 1,023,665 | 3/1966 | Great Britain. |

MARION PARSONS, JR., *Primary Examiner.*